Dec. 11, 1923.
G. A. BILGERE
STEERING GEAR
Filed Jan. 17, 1921
1,476,870
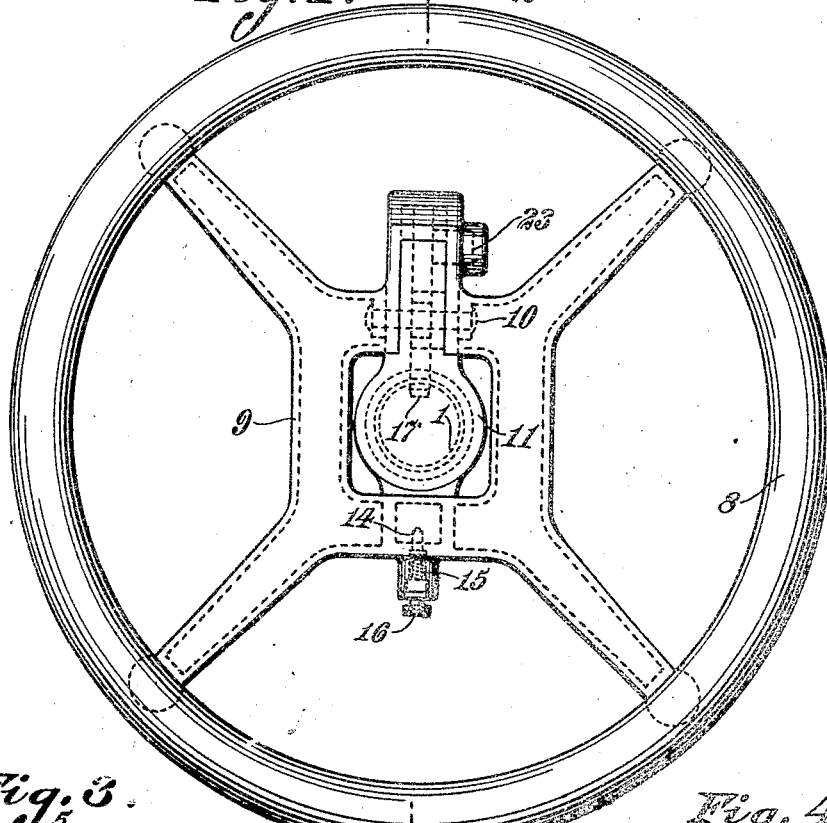
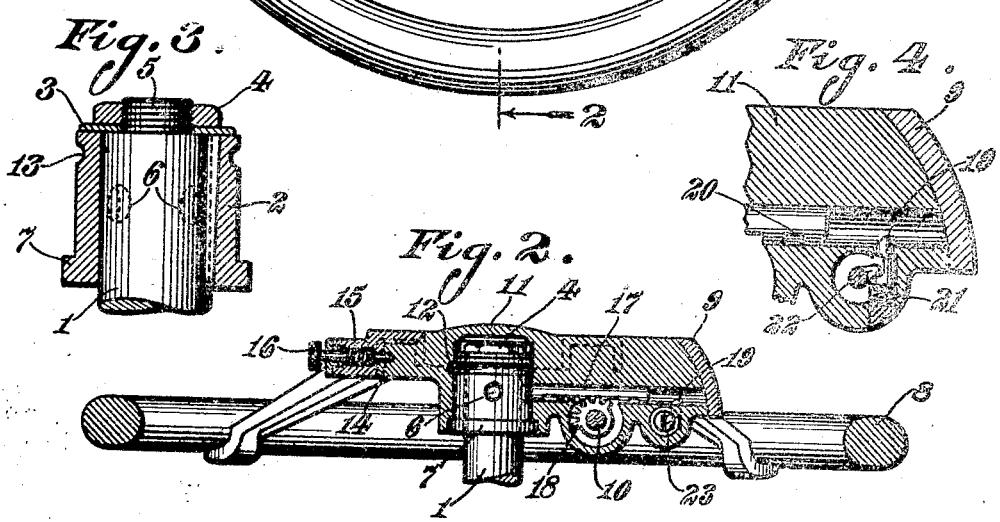
Inventor:
GEORGE A. BILGERE,
By John H. Bruninga
His Attorney Patented Dec. 11, 1923.

1,476,870

UNITED STATES PATENT OFFICE.

GEORGE A. BILGERE, OF ST. LOUIS, MISSOURI.

STEERING GEAR.

Application filed January 17, 1921. Serial No. 437,825.

*To all whom it may concern:*

Be it known that I, GEORGE A. BILGERE, a citizen of the United States, and residing at St. Louis, Missouri, have invented the new and useful Improvement in Steering Gears, of which the following is a specification.

This invention relates to steering gears, and more particularly to theft preventing means adapted to render the wheel selectively effective or ineffective, as by releasing the wheel from the shaft so as to prevent effective steering of the automobile.

One of the objects of this invention is to provide a steering wheel which when in steering position is effective for steering, and which when moved to non-steering position is rendered ineffective and locked in that position.

Another object of this invention is to provide a steering gear in which the wheel is mounted for free rotation on the shaft and for movement to operative and inoperative position, but whereby when the wheel is moved to inoperative position, it is not only released from the shaft to spin thereon, but is maintained in that condition until again rendered operative.

Further objects will appear from the detail description taken in connection with the accompanying drawing, in which:

Figure 1 is a plan of a wheel of a steering gear embodying this invention;

Figure 2 is a section on the line 2—2, Figure 1;

Figure 3 is an enlarged detail of Figure 2; and

Figure 4 is an enlarged detail of Figure 2.

Referring to the accompanying drawing, 1 designates the operated element, such as the usual steering shaft which, however, in this case has keyed thereon a sleeve 2 maintained in position by a washer 3 and a nut 4 screwed on a reduced threaded end 5 of the shaft. This sleeve has a series of sockets 6 therein and has an enlarged portion 7 forming a shoulder.

The steering wheel comprises a rim 8 mounted on a frame 9 which in turn is pivoted by a shaft 10 on a carrier 11. This carrier 11 fits over the sleeve 2 and rests thereon and is secured by a pin 12 driven into the carrier and engaging a groove 13 in the sleeve, so as to maintain the carrier for rotative movement on the sleeve, but prevent its withdrawal. The top of the carrier is closed so as to cover the connections to the wheel, and the shaft 10 is not only fixed in the steering wheel frame but the ends are also riveted over. The pin 12 is furthermore not only driven tightly into the carrier, but it only extends partly therethrough and its outer end is flush with the carrier so as to prevent its withdrawal.

With this pivotal construction the wheel is mounted for movement to operative or steering position, and to inoperative or non-steering position. The wheel swings on the axis 10, but in order to secure it in position, a plunger 14 is provided in the frame adapted to engage a socket in the carrier, a spring 15 being provided to retain the plunger in the socket and this plunger being provided with a knob 16 to permit its withdrawal. Accordingly by withdrawing the plunger, the wheel can be swung upwardly on its shaft to inoperative or non-steering position.

Mounted in the carrier is a bolt 17 which is adapted to cooperate with any of the sockets 6 in the sleeve 2 and this bolt is provided with a rack cooperating with a segment 18 fixed to the shaft 10. Mounted also in the carrier is a lock bolt 19 arranged to cooperate with a recess or keeper 20 in the bolt 17, the end of the bolt 17 being beveled to cooperate with the cooperating beveled face on the bolt 19. The bolt 19 is normally held in operative position by the spring 21 and is further acted upon by the movable element 22 of any suitable lock 23.

When the wheel is in operative or steering position, as shown in Figures 1 and 2, the bolt 17 will have entered one of the sockets 6 to securely lock or fix the wheel to the shaft. When the driver desires to leave the automobile, he will withdraw the plunger 14 from its socket and raise the wheel to inoperative or non-steering position. This will cause the segment 18 to withdraw the bolt 17 from its engaged socket, thereby releasing the wheel from the shaft and permitting it to spin thereon. This releasing movement of the bolt will, however, cause it to cooperate with the lock bolt 19 so that the latter will be depressed against the tension of its spring and then snapped into the recess or keeper 20. The wheel is now not only held in inoperative or non-steering position but the wheel is free on the shaft so that it can spin thereon and it cannot be again fixed to the shaft nor can it be lowered until the lock bolt 19 has been withdrawn from its keeper 20 to release the bolt 17. This can only be accomplished by the insertion of a key into the lock 23 which will withdraw the lock bolt 19, release the bolt 17 and permit the wheel to be lowered. The lowering of the wheel to operative or steering position will cause the bolt 17 to again enter one of the sockets 6 and securely fix the wheel to the shaft, the parts being held in operative position by the plunger 14.

It will, therefore, be seen that the invention accomplishes its objects. When the driver leaves the automobile he will naturally raise the wheel; this operation will, however, not only release the wheel rotatively, but will also lock it in that condition and position, and this is done automatically without requiring the use of a key at that time. In accordance with this invention, not only is the bolt guarded against unauthorized manipulation on account of its being inclosed and inaccessible, but the mechanism retaining it is a lock which requires for its manipulation a key or like means within the control only of the authorized person. It is, therefore, insured that when the automobile is left standing, the wheel will be placed in condition and position to prevent theft thereof. Furthermore, when the driver enters the car, he must necessarily lower the wheel; but this fixes the same to the shaft; it is, therefore, insured that when the automobile is started the wheel will be fixed to the shaft.

In accordance with this invention, therefore, the bolt, which is secured against unauthorized manipulation, is adapted to selectively render the wheel effective and ineffective to operate the operated element or shaft when the wheel is in steering and non-steering positions respectively, while the lock is adapted to automatically lock the bolt in ineffective relation when the wheel is moved to non-steering position; however, the lock permits movement of the wheel to non-steering position and locks both the wheel and the bolt when the wheel is so moved.

It is obvious that various changes may be made in the details of construction without departing from the spirit of this invention; it is, therefore, to be understood that this invention is not to be limited to the specific details shown and described.

Having thus described the invention, what is claimed is:

1. A steering gear, comprising, a shaft, a wheel mounted for free rotation and for movement to operative and inoperative positions, means for fixing said wheel against rotation on said shaft, lock controlled means adapted to retain and guard said wheel in inoperative position and against unauthorized manipulation, and means operated upon movement of said wheel to inoperative position adapted to release the same rotatively and effect cooperation with said lock controlled means.

2. A steering gear, comprising, a shaft, a wheel mounted for free rotation and for movement to operative and inoperative positions, means for fixing said wheel against rotation on said shaft, and means operated upon movement of said wheel to inoperative position adapted to automatically release the same rotatively and automatically lock the same in such inoperative position and guard the same against unauthorized manipulation.

3. A steering gear, comprising, a shaft, a wheel mounted for free rotation and for movement to operative and inoperative positions, means for fixing said wheel against rotation on said shaft, and means guarded against unauthorized manipulation and operated upon movement of said wheel to inoperative position adapted to release the same rotatively and lock the same against connection to said shaft.

4. A steering gear, comprising, a shaft, a wheel mounted for free rotation and for movement to operative and inoperative positions, means for fixing said wheel against rotation on said shaft, and means guarded against unauthorized manipulation and operated upon movement of said wheel to inoperative position adapted to release the same rotatively and lock the same in such inoperative position and against connection to said shaft.

5. A steering gear, comprising, a shaft, a wheel mounted for free rotation and for movement to operative and inoperative positions, a bolt guarded against unauthorized manipulation for fixing said wheel against rotation on said shaft, a lock adapted to secure said bolt, and means operated upon movement of said wheel adapted to cause cooperation of said bolt with said lock.

6. A steering gear, comprising, a shaft, a wheel mounted for free rotation and for movement to operative and inoperative positions, a bolt guarded against unauthorized manipulation for fixing said wheel against rotation on said shaft, a lock adapted to secure said bolt and said wheel, and means operated upon movement of said wheel adapted to cause cooperation of said bolt with said lock.

7. A steering gear, comprising, a shaft, a wheel mounted for free rotation and for movement to operative and inoperative positions, a bolt guarded against unauthorized manipulation for fixing said wheel against rotation on said shaft, a lock adapted to secure said bolt in releasing position, and means operated upon movement of said wheel adapted to cause cooperation of said bolt with said lock.

8. A steering gear, comprising, a shaft, a wheel mounted for free rotation and for movement to operative and inoperative positions, a bolt guarded against unauthorized manipulation for fixing said wheel against rotation on said shaft, a lock adapted to secure said bolt, and means operated upon movement of said wheel to inoperative position adapted to cause cooperation of said bolt with said lock.

9. A steering gear, comprising, a shaft, a wheel mounted for free rotation and for movement to operative and inoperative positions, a bolt guarded against unauthorized manipulation for fixing said wheel against rotation on said shaft, a lock adapted to secure said bolt in releasing position, and means operated upon movement of said wheel to inoperative position adapted to cause cooperation of said bolt with said lock.

10. A steering gear, comprising, a shaft, a wheel mounted for free rotation and for movement to operative and inoperative positions, a bolt for fixing said wheel against rotation on said shaft, a lock adapted to secure said bolt, and an operating connection between said wheel and said bolt adapted to engage said bolt with said lock.

11. A steering gear, comprising, a shaft, a wheel mounted for free rotation and for movement to operative and inoperative positions, a bolt for fixing said wheel against rotation on said shaft, a lock adapted to secure said bolt, and an operating connection between said wheel and said bolt adapted to engage said bolt with said lock upon movement of said wheel to inoperative position.

12. A steering gear, comprising, a shaft, a wheel mounted for free rotation and for movement to operative and inoperative positions, a bolt for fixing said wheel against rotation on said shaft, a lock adapted to secure said bolt and said wheel, and an operating connection between said wheel and said bolt adapted to engage said bolt with said lock.

13. A steering gear, comprising, a shaft, a wheel mounted for free rotation and for movement to operative and inoperative positions, a bolt for fixing said wheel against rotation on said shaft, a lock adapted to secure said bolt in releasing position, and an operating connection between said wheel and said bolt adapted to engage said bolt with said lock.

14. A steering gear, comprising, a shaft, a wheel mounted for free rotation and for movement to operative and inoperative positions, a bolt for fixing said wheel against rotation on said shaft, a lock adapted to secure said bolt in releasing position and said wheel in inoperative position, and an operating connection between said wheel and said bolt adapted to engage said bolt with said lock.

15. A steering gear, comprising, a shaft, a wheel mounted for free rotation and for movement to operative and inoperative positions, releasable means secured against unauthorized manipulation for fixing said wheel against rotation on said shaft, and means adapted upon movement of the wheel to inoperative position to release and lock said fixing means.

16. A steering gear, comprising, a shaft, a wheel mounted for free rotation and for movement to operative and inoperative positions, a bolt adapted to fix said wheel to said shaft, and means guarded against unauthorized manipulation and operated upon movement of the wheel to inoperative position, adapted to release and automatically lock said bolt.

17. A steering gear, comprising, a shaft, a wheel mounted for free rotation and for movement to operative and inoperative positions, a lock, means adapted to fix said wheel to said shaft when the wheel is in operative position, and means for releasing said wheel from said shaft upon movement of said wheel to inoperative position, adapted to effect cooperation of said fixing means with said lock.

18. A steering gear, comprising, a steering shaft, a steering wheel adapted for movement to operative and inoperative positions, a lock, and means operating upon movement to inoperative position adapted to disengage said wheel from said shaft and adapted to effect engagement with said lock.

19. A steering gear, comprising, a shaft, a wheel mounted on said shaft and for movement to operative and inoperative positions, means secured against unauthorized manipulation adapted to render said wheel ineffective to operate said shaft, and means effective upon movement of said wheel to inoperative position adapted to lock said means.

20. A steering gear, comprising, a shaft, a wheel mounted on said shaft and for movement to operative and inoperative positions, a bolt adapted to control the operation of said shaft by said wheel, and means guarded against unauthorized manipulation and effective upon movement of said wheel to inoperative position adapted to operate and automatically lock said bolt.

21. A steering gear, comprising, an operated element, a wheel mounted for movement to steering and non-steering positions, means secured against unauthorized manipulation adapted to selectively render said wheel effective and ineffective to operate said element when said wheel is in steering and non-steering positions respectively, and means adapted to automatically lock said means in ineffective relation when said wheel is moved to non-steering position.

22. A steering gear, comprising, an operated element, a wheel mounted for movement to steering and non-steering positions, means secured against unauthorized manipulation adapted to selectively render said wheel effective and ineffective to operate said element when said wheel is in steering and non-steering positions respectively, and means permitting movement of said wheel to non-steering position adapted to lock said means in ineffective relation when said wheel is so moved.

23. A steering gear, comprising, a shaft, a wheel mounted on said shaft and for movement to operative and inoperative positions, means secured against unauthorized manipulation adapted to render said wheel ineffective to operate said shaft, and means effective upon movement of said wheel to inoperative position adapted to lock said means with said wheel in inoperative position.

24. A steering gear, comprising, a shaft, a wheel mounted on said shaft and for movement to operative and inoperative positions, means secured against unauthorized manipulation adapted to render said wheel ineffective to operate said shaft and adapted to retain said wheel in inoperative position, and means effective upon movement of said wheel to inoperative position adapted to lock said means.

25. A steering gear, comprising, a shaft, a wheel mounted on said shaft and for movement to operative and inoperative positions, means secured against unauthorized manipulation and interconnected with said wheel adapted to render said wheel ineffective to operate said shaft when said wheel is moved to inoperative position, and means effective upon movement of said wheel to inoperative position adapted to lock said means.

26. A steering gear, comprising, an operated element, a wheel mounted for movement to steering and non-steering positions, means secured against unauthorized manipulation adapted to selectively render said wheel effective and ineffective to operate said element when said wheel is in steering and non-steering positions respectively, and means adapted to automatically lock said means in ineffective relation and said wheel in non-steering position when said wheel is moved to non-steering position.

27. A steering gear, comprising, an operated element, a wheel mounted for movement to steering and non-steering positions, means secured against unauthorized manipulation adapted to selectively render said wheel effective and ineffective to operate said element when said wheel is in steering and non-steering positions respectively, and means adapted to automatically lock said means in ineffective relation when said wheel is moved to non-steering position, said locking means being adapted for authorized manipulation in order to permit said wheel to be moved back to effective steering position.

In testimony whereof I affix my signature this 16th day of December, 1920.

GEORGE A. BILGERE.